US012742037B2

(12) United States Patent
Reddy et al.

(10) Patent No.: US 12,742,037 B2
(45) Date of Patent: Sep. 22, 2026

(54) CURABLE PHOTOCHROMIC COMPOSITION

(71) Applicant: Transitions Optical, Ltd., Tuam (IE)

(72) Inventors: Ramaiahgari Reddy, Murrysville, PA (US); Anil Kumar, Murrysville, PA (US)

(73) Assignee: Transitions Optical, Ltd., Tuam (IE)

( * ) Notice: Subject to any disclaimer, the term of this patent is extended or adjusted under 35 U.S.C. 154(b) by 496 days.

(21) Appl. No.: 18/563,585

(22) PCT Filed: May 26, 2021

(86) PCT No.: PCT/EP2021/064044

§ 371 (c)(1),
(2) Date: Nov. 22, 2023

(87) PCT Pub. No.: WO2022/248034

PCT Pub. Date: Dec. 1, 2022

(65) Prior Publication Data

US 2024/0254275 A1 Aug. 1, 2024

(51) Int. Cl.

| | |
|---|---|
| ***C09D 175/04*** | (2006.01) |
| ***C08G 18/22*** | (2006.01) |
| ***C08G 18/40*** | (2006.01) |
| ***C08G 18/44*** | (2006.01) |
| ***C08G 18/62*** | (2006.01) |
| ***C08G 18/80*** | (2006.01) |
| ***C08K 5/00*** | (2006.01) |
| ***C09D 5/29*** | (2006.01) |
| ***C09D 7/41*** | (2018.01) |

(52) U.S. Cl.

CPC .......... *C08G 18/80* (2013.01); *C08G 18/227* (2013.01); *C08G 18/4063* (2013.01); *C08G 18/44* (2013.01); *C08G 18/6279* (2013.01); *C08K 5/0041* (2013.01); *C09D 5/29* (2013.01); *C09D 7/41* (2018.01); *C09D 175/04* (2013.01)

(58) Field of Classification Search

CPC .......... C09D 5/29; C09D 7/41; C09D 175/04; C08G 18/227; C08G 18/4063; C08G 18/44; C08G 18/6279

See application file for complete search history.

(56) References Cited

U.S. PATENT DOCUMENTS

| | | | | |
|---|---|---|---|---|
| 4,345,057 | A | 8/1982 | Yamabe et al. | |
| 4,931,220 | A | 6/1990 | Haynes et al. | |
| 5,178,915 | A | 1/1993 | Moyle et al. | |
| 5,645,767 | A | 7/1997 | Van Gemert | |
| 5,658,501 | A | 8/1997 | Kumar et al. | |
| 5,962,617 | A | 10/1999 | Slagel | |
| 6,242,557 | B1 | 6/2001 | Temtchenko et al. | |
| 11,525,027 | B2 | 12/2022 | Robinson et al. | |
| 2003/0174560 | A1 | 9/2003 | Dahmen et al. | |
| 2012/0145973 | A1 | 6/2012 | Bancroft et al. | |
| 2014/0125947 | A1* | 5/2014 | Imizu | G02B 1/14 351/159.61 |
| 2016/0376025 | A1* | 12/2016 | Bimanand | C08J 7/043 428/334 |
| 2023/0048395 | A1* | 2/2023 | Robinson | C09K 9/02 |

FOREIGN PATENT DOCUMENTS

| | | | |
|---|---|---|---|
| CN | 104628928 | A | 5/2015 |
| WO | 2019029794 | A1 | 2/2019 |

* cited by examiner

*Primary Examiner* — Michael L Leonard
(74) *Attorney, Agent, or Firm* — The Webb Law Firm

(57) ABSTRACT

The invention relates to a curable photochromic composition including (a) a photochromic material, (b) an active hydrogen group-containing component of (i) an active hydrogen group-containing fluorinated polymer having an active hydrogen group equivalent weight ranging from 200 to 5000 g/mole and a number average molecular weight ranging from 5,000 to 50,000 g/mole, and (ii) a polymer having at least two active hydrogen groups per molecule, a number average molecular weight of at least 1000 g/mole, and an equivalent weight of at least 500 g/mole; and (c) a curing agent having functional groups which are reactive with active hydrogen groups. Also provided are photochromic articles.

15 Claims, No Drawings

CURABLE PHOTOCHROMIC COMPOSITION

CROSS-REFERENCE TO RELATED APPLICATION

This application is the United States national phase of International Application No. PCT/BP2021/064044 filed May 26, 2021, the disclosure of which is hereby incorporated by reference in its entirety.

FIELD

The present invention relates to curable photochromic compositions, which include a photochromic compound, an active hydrogen group-containing polymer, such as a fluorinated polymer, and a curing agent. Photochromic articles prepared from such compositions are also provided.

BACKGROUND

In response to certain wavelengths of electromagnetic radiation (or "actinic radiation"), photochromic compounds, such as indeno-fused naphthopyrans, typically undergo a transformation from one form or state to another form, with each form having a characteristic or distinguishable absorption spectrum associated therewith. Typically, upon exposure to actinic radiation, many photochromic compounds are transformed from a closed-form, which corresponds to an unactivated (or bleached, e.g., substantially colorless) state of the photochromic compound, to an open-form, which corresponds to an activated (or colored) state of the photochromic compound. In the absence of exposure to actinic radiation, such photochromic compounds are reversibly transformed from the activated (or colored) state, back to the unactivated (or bleached) state. Compositions and articles, such as optical lenses, that contain photochromic compounds or have photochromic compounds applied thereto (e.g., in the form of a photochromic coating composition) typically display colorless (e.g., clear) and colored states that correspond to the colorless and colored states of the photochromic compounds contained therein or applied thereto.

Photochromic compounds can be used in curable compositions to form, for example, cured layers, such as cured films or sheets that are photochromic. With cured photochromic films, such as cured photochromic coatings, it is typically desirable that they provide a combination of hardness and photochromic performance. Generally, the kinetics associated with the reversible transformation of a photochromic compound between a closed-form (unactivated/colorless) and an open-form (activated/colored) is faster in a soft matrix, but slower in a hard matrix (of the cured film in which the photochromic compound resides). Cured photochromic films having a soft matrix typically have reduced hardness, while those having a hard matrix typically have increased hardness.

It would be desirable to develop curable photochromic compositions that provide cured photochromic layers having acceptable hardness, improved kinetics, and improved dye fatigue.

SUMMARY

The present invention is directed to a curable photochromic composition comprising:

(a) at least one photochromic material;

(b) an active hydrogen group-containing component comprising:

(i) an active hydrogen group-containing fluorinated polymer having an active hydrogen group equivalent weight ranging from 200 to 5000 g/mole and a number average molecular weight ranging from 5,000 to 50,000 g/mole; and (ii) a polymer having at least two active hydrogen groups per molecule, a number average molecular weight of at least 1000 g/mole, and an equivalent weight of at least 500 g/mole; and (c) a curing agent comprising functional groups which are reactive with active hydrogen groups.

The present invention also provides an article comprising:

(A) a substrate; and (B) a photochromic layer over at least a portion of the substrate, wherein the photochromic layer is formed from the curable composition described above.

DETAILED DESCRIPTION

As used herein, the articles "a", "an", and "the" include plural referents unless otherwise expressly and unequivocally limited to one referent.

Unless otherwise indicated, all ranges or ratios disclosed herein are to be understood to encompass any and all subranges or sub-ratios subsumed therein. For example, a stated range or ratio of "1 to 10" should be considered to include any and all subranges between (and inclusive of) the minimum value of 1 and the maximum value of 10; that is, all sub-ranges or sub-ratios beginning with a minimum value of 1 or more and ending with a maximum value of 10 or less, such as but not limited to 1 to 6.1, 3.5 to 7.8, and 5.5 to 10.

Other than in the operating examples, or where otherwise indicated, all numbers expressing quantities of ingredients, reaction conditions, and so forth used in the specification and claims are to be understood as modified in all instances by the term "about".

As used herein, "at least one of" is synonymous with "one or more of", whether the elements are listed conjunctively or disjunctively. For example, the phrases "at least one of A, B, and C" and "at least one of A, B, or C" each mean any one of A, B, or C, or any combination of any two or more of A, B, or C. For example, A alone; or B alone; or C alone; or A and B; or A and C; or B and C; or all of A, B, and C.

As used herein, "selected from" is synonymous with "chosen from" whether the elements are listed conjunctively or disjunctively. Further, the phrases "selected from A, B, and C" and "selected from A, B, or C" each mean any one of A, B, or C, or any combination of any two or more of A, B, or C. For example, A alone; or B alone; or C alone; or A and B; or A and C; or B and C; or all of A, B, and C.

As used herein, molecular weight values of polymers, such as weight average molecular weights (Mw) and number average molecular weights (Mn), are determined by gel permeation chromatography using appropriate standards, such as polystyrene standards.

As used herein, polydispersity index (PDI) values represent a ratio of the weight average molecular weight (Mw) to the number average molecular weight (Mn) of the polymer (i.e., Mw/Mn).

As used herein, the term "polymer" means homopolymers (e.g., prepared from a single monomer species), copolymers (e.g., prepared from at least two monomer species), and graft polymers.

As used herein, the term "(meth)acrylate" and similar terms, such as "(meth)acrylic acid ester", means methacrylates and/or acrylates. As used herein, the term "(meth) acrylic acid" means methacrylic acid and/or acrylic acid.

As used herein, the term "photochromic" and similar terms, such as "photochromic compound", means having an absorption spectrum for at least visible radiation that varies in response to absorption of at least actinic radiation. Further, as used herein, the term "photochromic material" means any substance that displays or is adapted to display photochromic properties (such as adapted to have an absorption spectrum for at least visible radiation that varies in response to absorption of at least actinic radiation) and which includes at least one photochromic compound.

As used herein, the term "actinic radiation" means electromagnetic radiation that is capable of causing a response in a material, such as, but not limited to, transforming a photochromic material from one form or state to another as will be discussed in further detail herein.

As used herein, the term "photochromic material" includes thermally reversible photochromic materials and compounds and non-thermally reversible photochromic materials and compounds. The term "thermally reversible photochromic compounds/materials" as used herein means compounds/materials capable of converting from a first state, for example a "clear state", to a second state, for example a "colored state", in response to actinic radiation, and reverting back to the first state in response to thermal energy. The term "non-thermally reversible photochromic compounds/materials" as used herein means compounds/materials capable of converting from a first state, for example a "clear state", to a second state, for example a "colored state", in response to actinic radiation, and reverting back to the first state in response to actinic radiation of substantially the same wavelength(s) as the absorption(s) of the colored state.

As used herein, to modify the term "state", the terms "first" and "second" are not intended to refer to any particular order or chronology, but instead refer to two different conditions or properties. For purposes of non-limiting illustration, the first state and the second state of a photochromic compound can differ with respect to at least one optical property, such as but not limited to the absorption of visible and/or UV radiation. Thus, the photochromic compounds of the present invention can have a different absorption spectrum in each of the first and second states. For example, while not limiting herein, a photochromic compound of the present invention can be clear in the first state and colored in the second state. Alternatively, a photochromic compound of the present invention can have a first color in the first state and a second color in the second state.

As used herein, the term "optical" means pertaining to or associated with light and/or vision. For example, according to various non-limiting embodiments disclosed herein, the optical article or element or device can be chosen from ophthalmic articles, elements and devices, display articles, elements and devices, windows, mirrors, and active and passive liquid crystal cell articles, elements and devices.

As used herein, the term "ophthalmic" means pertaining to or associated with the eye and vision. Non-limiting examples of ophthalmic articles or elements include corrective and non-corrective lenses, including single vision or multi-vision lenses, which can be either segmented or non-segmented multi-vision lenses (such as, but not limited to, bifocal lenses, trifocal lenses and progressive lenses), as well as other elements used to correct, protect, or enhance (cosmetically or otherwise) vision, including, without limitation, contact lenses, intra-ocular lenses, magnifying lenses, and protective lenses or visors.

As used herein, the term "display" means the visible or machine-readable representation of information in words, numbers, symbols, designs or drawings. Non-limiting examples of display elements include screens, monitors, and security elements, such as security marks.

As used herein, the term "window" means an aperture adapted to permit the transmission of radiation therethrough. Non-limiting examples of windows include automotive and aircraft transparencies, windshields, filters, shutters, and optical switches.

As used herein, the term "mirror" means a surface that specularly reflects a large fraction of incident light.

As used herein, the term "liquid crystal cell" refers to a structure containing a liquid crystal material that is capable of being ordered. A non-limiting example of a liquid crystal cell element is a liquid crystal display.

As used herein, spatial or directional terms, such as "left", "right", "inner", "outer", "above", "below", and the like, relate to various orientations of the invention as may be described further herein, such as articles and multilayer articles of the present invention. It is to be understood, however, that the invention can assume various alternative orientations to those described herein and, accordingly, such terms are not to be considered as limiting.

As used herein, the terms "formed over", "deposited over", "provided over", "applied over", "residing over", or "positioned over" mean formed, deposited, provided, applied, residing, or positioned on but not necessarily in direct (or abutting) contact with the underlying element, or surface of the underlying element. For example, a layer "positioned over" a substrate does not preclude the presence of one or more other layers, coatings, or films of the same or different composition located between the positioned or formed layer and the substrate.

All documents, such as but not limited to issued patents and patent applications, referred to herein, and unless otherwise indicated, are to be considered to be "incorporated by reference" in their entirety.

As used herein, recitations of "linear or branched" groups, such as linear or branched alkyl, are herein understood to include a methylene group or a methyl group; groups that are linear, such as linear $C_2$-$C_{20}$ alkyl groups; and groups that are appropriately branched, such as branched $C_3$-$C_{20}$ alkyl groups.

As used herein, recitations of "optionally substituted" group, means a group, including but not limited to, alkyl group, cycloalkyl group, heterocycloalkyl group, aryl group, and/or heteroaryl group, in which at least one hydrogen thereof has been optionally replaced or substituted with a group that is other than hydrogen, such as, but not limited to, halo groups (e.g., F, Cl, I, and Br), hydroxyl groups, ether groups, thiol groups, thio ether groups, carboxylic acid groups, carboxylic acid ester groups, phosphoric acid groups, phosphoric acid ester groups, sulfonic acid groups, sulfonic acid ester groups, nitro groups, cyano groups, alkyl groups (including aralkyl groups); alkenyl groups; alkynyl groups; haloalkyl groups; perhaloalkyl groups; heterocycloalkyl groups; aryl groups (including alkaryl groups, including hydroxyl substituted aryl, such as phenol, and including poly-fused-ring aryl); heteroaryl groups (including poly-fused-ring heteroaryl groups); or amine groups, such as $—N(R_{11}')(R_{12}')$ where $R_{11}'$ and $R_{12}'$ are each independently selected from hydrogen, linear or branched $C_1$-$C_{20}$ alkyl, $C_3$-$C_{12}$ cycloalkyl, $C_3$-$C_{12}$ heterocycloalkyl, aryl, or heteroaryl.

As used herein, recitations of "halo substituted" and related terms (such as, but not limited to, haloalkyl groups, haloalkenyl groups, haloalkynyl groups, haloaryl groups and halo-heteroaryl groups) means a group in which at least one, and up to and including all of the available hydrogen groups thereof, is substituted with a halo group. The term "halo-substituted" is inclusive of "perhalo-substituted". As used herein, the term perhalo-substituted group and related terms (such as, but not limited to, perhaloalkyl groups, perhaloalkenyl groups, perhaloalkynyl groups, perhaloaryl groups and perhalo-heteroaryl groups) means a group in which all of the available hydrogen groups thereof are substituted with a halo group. For example, perhalomethyl is $—CX_3$; perhalophenyl is $—C_6X_5$, where X represents one or more halo groups, such as but not limited to F.

Representative alkyl groups include, but are not limited to, methyl, ethyl, propyl, isopropyl, butyl, isobutyl, sec-butyl, tert-butyl, pentyl, neopentyl, hexyl, heptyl, octyl, nonyl and decyl. Representative alkenyl groups include, but are not limited to, vinyl, allyl and propenyl. Representative alkynyl groups include, but are not limited to, ethynyl, 1-propynyl, 2-propynyl, 1-butynyl, and 2-butynyl. Representative cycloalkyl groups include, but are not limited to, cyclopropyl, cyclobutyl, cyclopentyl, cyclohexyl, and cyclooctyl substituents. Representative heterocycloalkyl groups include, but are not limited to, imidazolyl, tetrahydrofuranyl, tetrahydropyranyl and piperidinyl. Representative aryl groups include, but are not limited to, phenyl, naphthyl, anthracynyl and triptycenyl. Representative heteroaryl groups include, but are not limited to, furanyl, pyranyl, pyridinyl, isoquinoline, and pyrimidinyl. Representative aralkyl groups include, but are not limited to, benzyl, and phenethyl.

The term "alkyl" as used herein means linear or branched alkyl, such as but not limited to linear or branched $C_1$-$C_{25}$ alkyl, or linear or branched $C_1$-$C_{10}$ alkyl, or linear or branched $C_2$-$C_{10}$ alkyl. Examples of alkyl groups from which the various alkyl groups of the present invention can be selected from, include, but are not limited to, those recited previously herein. The term "cycloalkyl" as used herein means groups that are appropriately cyclic, such as but not limited to $C_3$-$C_{12}$ cycloalkyl (including, but not limited to, cyclic $C_5$-$C_7$ alkyl) groups. Examples of cycloalkyl groups include those recited previously herein. The term "cycloalkyl" as used herein also includes: bridged ring polycycloalkyl groups (or bridged ring polycyclic alkyl groups), such as but not limited to bicyclo[2.2.1]heptyl (or norbornyl) and bicyclo[2.2.2]octyl; and fused ring polycycloalkyl groups (or fused ring polycyclic alkyl groups), such as, but not limited to, octahydro-1H-indenyl, and decahydronaphthalenyl.

The term "heterocycloalkyl" as used herein means groups that are appropriately cyclic, such as but not limited to $C_3$-$C_{12}$ heterocycloalkyl groups or $C_5$-$C_7$ heterocycloalkyl groups, and which have at least one hetero atom in the cyclic ring, such as, but not limited to, O, S, N, P, and combinations thereof. Examples of heterocycloalkyl groups include, but are not limited to, those recited previously herein. The term "heterocycloalkyl" as used herein also includes: bridged ring polycyclic heterocycloalkyl groups, such as but not limited to 7-oxabicyclo[2.2.1]heptanyl; and fused ring polycyclic heterocycloalkyl groups, such as but not limited to octahydrocyclopenta[b]pyranyl, and octahydro-1H-isochromenyl.

The term "heteroaryl", as used herein, includes but is not limited to $C_5$-$C_{18}$ heteroaryl, such as but not limited to $C_5$-$C_{10}$ heteroaryl (including fused ring polycyclic heteroaryl groups) and means an aryl group having at least one hetero atom in the aromatic ring, or in at least one aromatic ring in the case of a fused ring polycyclic heteroaryl group. Examples of heteroaryl groups include, but are not limited to, those recited previously herein. The term "aralkyl", as used herein, includes but is not limited to $C_6$-$C_{24}$ aralkyl, such as but not limited to $C_6$-$C_{10}$ aralkyl, and means an aryl group substituted with an alkyl group. Examples of aralkyl groups include, but are not limited to, those recited previously herein.

As previously mentioned, the present invention is directed to a curable photochromic composition comprising: (a) at least one photochromic material; (b) an active hydrogen group-containing component comprising: (i) an active hydrogen group-containing fluorinated polymer having an active hydrogen group equivalent weight ranging from 200 to 5000 g/mole and a number average molecular weight ranging from 5,000 to 50,000 g/mole; and (ii) a polymer having at least two active hydrogen groups per molecule, a number average molecular weight of at least 1000 g/mole, and an equivalent weight of at least 500 g/mole; and (c) a curing agent comprising functional groups which are reactive with active hydrogen groups.

The photochromic material (a) can be selected from inorganic and/or organic photochromic compounds. When two or more photochromic compounds are used in combination, they are generally chosen to complement one another to produce a desired color or hue.

Non-limiting examples of suitable organic photochromic compounds can include benzopyrans, naphthopyrans (for example naphtho[1,2-b]pyrans and naphtho[2,1-b]pyrans) spiro-9-fluoreno[1,2-b]pyrans, phenanthropyrans, quinopyrans, and indeno-fused naphthopyrans, such as those disclosed in U.S. Pat. No. 5,645,767 at column 1, line 10 to column 12, line 57 and in U.S. Pat. No. 5,658,501 at column 1, line 64 to column 13, line 36, which disclosures are incorporated herein by reference. Additional non-limiting examples of organic photochromic compounds that may be used include oxazines, such as benzoxazines, naphthoxazines, and spirooxazines. Other non-limiting examples of photochromic compounds that may be used include: fulgides and fulgimides, for example 3-furyl and 3-thienyl fulgides and fulgimides, which are described in U.S. Pat. No. 4,931,220 at column 20, line 5 through column 21, line 38, which disclosure is incorporated herein by reference; diarylethenes, which are described in U.S. Patent Application Publication No. 2003/0174560 from paragraph to [0086], which disclosure is incorporated herein by reference; and combinations of any of the aforementioned photochromic compounds. For example, the photochromic material (a) can comprise a compound selected from the group consisting of naphthopyrans, benzopyrans, phenanthropyrans, indenonaphthopyrans, spiro(indoline) naphthoxazines, spiro(indoline)pyridobenzoxazines, spiro (benzindoline)naphthoxazines, spiro(benzindoline)pyridobenzoxazines, spiro(indoline)-benzoxazines, fulgides, fulgimides, and mixtures thereof.

The photochromic compounds described herein can be incorporated into the curable photochromic composition of the present invention by addition to the composition and/or by dissolving it in a solvent before adding to the curable composition components. The photochromic compounds can be added to the present compositions in an amount sufficient to produce a desired change in optical density (AOD) when the cured composition is exposed to radiation, such as ultraviolet (UV) radiation.

The photochromic material (a) is present in the curable photochromic composition in an amount at least sufficient to provide an article prepared from the composition with a desirable level of photochromic properties, which is referred to as a photochromic amount. The amount of photochromic material (a) present in the curable photochromic composition can range from 0.001 percent by weight to 40 percent by weight, or from 0.001 to 10 percent by weight, or from 0.01 to 10 percent by weight, or from 0.1 to 6.5 percent by weight, based on the total solids weight of curable photochromic composition (including the weight of the photochromic compound(s), and inclusive of the recited values).

The curable photochromic composition of the present invention also comprises (b) an active hydrogen group-containing component. Each of the active hydrogen groups present in the active hydrogen group-containing component (b) can be independently select from the group consisting of hydroxyl groups, thiol groups, primary amino groups, and secondary amino groups. Each active hydrogen group of the active hydrogen group-containing component (b) independently can be a hydroxyl group.

The active hydrogen group-containing component (b) comprises: (i) an active hydrogen group-containing fluorinated polymer having an active hydrogen group equivalent weight ranging from 200 to 5000 g/mole and a number average molecular weight ranging from 5,000 to 50,000 g/mole; and (ii) a polymer having at least two active hydrogen groups per molecule, a number average molecular weight of at least 1000 g/mole, and an equivalent weight of at least 500 g/mole.

The active hydrogen group-containing fluorinated polymer (i) can have an active hydrogen group equivalent weight ranging from 200 to 5000 g/mole, such as from 200 to 800 g/mole, or from 200 to 1000 g/mole, or from 200 to 1500 g/mole. Also, the active hydrogen group-containing fluorinated polymer (i) can have a number average molecular weight (Mn) ranging from 5,000 to 50,000 g/mole, such as from 5,000 to 25,000 g/mole, or from 5,000 to 20,000 g/mole.

The active hydrogen group-containing fluorinated polymer (i) can comprise a fluoroethylene vinyl ether copolymer. Suitable active hydrogen group-containing fluoroethylene vinyl ether copolymers can include units of a fluoroolefin, a cyclohexyl vinyl ether, an alkyl vinyl ether and a hydroxyalkyl vinyl ether at prescribed ratios. Such fluoroethylene vinyl ether copolymers and their preparation are described in detail in U.S. Pat. No. 4,345,057 at column 1, line 65, to column 8, line 2, the recited portions of which are incorporated by reference herein. Particularly useful are the fluoroethylene vinyl ether copolymers available under the tradename LUMIFLON from AGC Chemicals America; and fluoroaliphatic polymeric esters commercially available from 3M of St. Paul, Minnesota under the tradename FLUORAD.

The active hydrogen group-containing fluorinated polymer (i) can be present in the curable photochromic composition of the present invention in an amount ranging from 0.1 to 50 percent by weight, such as from 0.1 to 30 percent by weight, or from 1 to 25 percent by weight, or from 1 to 20 percent by weight, where weight percentages are based on total weight of solids in the curable photochromic composition.

The active hydrogen group-containing component (b) also comprises (ii) a polymer having at least two active hydrogen groups per molecule, a number average molecular weight of at least 1,000 g/mole, such as 1,000 to 50,000 g/mole, or 1,000 to 25,000 g/mole, or 1000 to 10,000 g/mole, or 1,000 to 5,000 g/mole; and an equivalent weight of at least 500 g/mole, such as 500 to 25,000 g/mole, or 500 to 10,000 g/mole, or 500 to 5,000 g/mole.

The active hydrogen group-containing polymer (ii) having at least two active hydrogen groups per molecule can be an active hydrogen group-containing polycarbonate polymer comprising two or more active hydrogen functional groups each independently selected from hydroxyl, thiol, primary amine, or secondary amine. Active hydrogen functionality can be independently introduced into the polycarbonate polymer during formation thereof, or after formation thereof, in accordance with art-recognized methods.

Suitable polycarbonate polymers can be prepared in accordance with art-recognized methods. For purposes of non-limiting illustration, suitable polycarbonate polyols can be prepared from the reaction of a polyol, such as a diol, with a carbonyl dihalide, such as carbonyl dichloride, with removal of the resulting halide acid, such as HCl. For purposes of further non-limiting illustration, the polycarbonate polyol can be prepared from a transesterification reaction of a polyol, such as a diol, and a dihydrocarbyl carbonate, such as diphenyl carbonate, with removal of the resulting hydroxyl functional hydrocarbyl, such as phenol.

Examples of polyols having at least two hydroxyl groups, from which polycarbonate polymer can be prepared, include, but are not limited to, glycerin, trimethylolpropane, trimethylolethane, trishydroxyethylisocyanurate, pentaerythritol, ethylene glycol, propylene glycol, trimethylene glycol, 1,3-, 1,2- and 1,4-butanediols, pentane diols (such as, but not limited to, 1,5-pentane diol), heptanediol, hexanediol, octanediol, 4,4'-(propane-2,2-diyl)dicyclohexanol, 4,4'-methylenedicyclohexanol, neopentyl glycol, 2,2,3-trimethylpentane-1,3-diol, 1,4-dimethylolcyclohexane, 2,2,4-trimethylpentane diol, 4,4'-(propane-2,2-diyl)diphenol, 4,4'-methylenediphenol, and like polyols.

Generally, the active hydrogen group-containing polycarbonate polymer (ii) comprising two or more active hydrogen functional groups is a polycarbonate polyol. Polycarbonate having hydroxyl functionality can be prepared from carbonates and polyols such as diols. Polycarbonate polyols, such as polycarbonate diols, can be selected from commercially available polycarbonate polyols, such as, but not limited to, ETERNACOLL polycarbonate diols from UBE America, Inc.

Reactants, reactant ratios, and reaction conditions should be selected to ensure that the resulting active hydrogen group-containing polycarbonate polymer (ii) has a number average molecular weight of at least 1000 g/mole, and an equivalent weight of at least 500 g/mole.

The active hydrogen group-containing polymer (ii) having at least two active hydrogen groups per molecule can be an active hydrogen group-containing polyester polymer comprising two or more active hydrogen functional groups each independently selected from hydroxyl, thiol, primary amine, or secondary amine. Active hydrogen functionality can be independently introduced into the polyester polymer during formation thereof, or after formation thereof, in accordance with art-recognized methods.

Suitable active hydrogen group-containing polyester polymers can independently be prepared in accordance with art-recognized methods. For purposes of non-limiting illustration, suitable active hydrogen group-containing polyester polymers can be prepared by reacting carboxylic acid functional materials (and/or cyclic anhydrides thereof, and/or esters thereof) having carboxylic acid functionalities (or effective carboxylic acid functionalities, such as in the case of cyclic anhydrides and carboxylic acid esters) of at least 2, and polyols having hydroxy functionalities of at least 2.

Examples of multifunctional carboxylic acids useful in preparing the polyester polymer can include, but are not limited to, phthalic acid, tetrahydrophthalic acid, hexahydrophthalic acid, endobicyclo-2,2,1,5-heptyne-2,3-dicarboxylic acid, tetrachlorophthalic acid, cyclohexanedioic acid, succinic acid, isophthalic acid, terephthalic acid, azelaic acid, maleic acid, trimesic acid, 3,6-dichlorophthalic acid, adipic acid, sebacic acid, and like multifunctional carboxylic acids (optionally including appropriate cyclic anhydrides thereof and/or esters thereof).

Examples of polyols that can be used to prepare the polyester polymers can include, but are not limited to, those polyol examples recited previously herein.

Reactants, reactant ratios, and reaction conditions should be selected to ensure that the resulting active hydrogen group-containing polyester polymer (ii) has a number average molecular weight of at least 1000 g/mole, and an equivalent weight of at least 500 g/mole.

The active hydrogen group-containing polymer (ii) having at least two active hydrogen groups per molecule can be an active hydrogen group-containing polyether polymer comprising two or more active hydrogen functional groups each independently selected from hydroxyl, thiol, primary amine, or secondary amine. Active hydrogen functionality can be independently introduced into the polyether polymer during formation thereof, or after formation thereof, in accordance with art-recognized methods.

The active hydrogen group-containing polyether polymer comprising two or more active hydrogen functional groups can be prepared in accordance with art-recognized methods. For purposes of non-limiting illustration, suitable polyether polymers can be prepared from the reaction of polyols having two or more hydroxy groups and polyepoxides having two or more epoxide (or oxirane) groups, which are reacted in proportions such that the resulting polyether has hydroxy functionality and/or oxirane functionality. The polyols and polyepoxides used in the preparation of the polyether segment can be selected from, for example, aliphatic, cycloaliphatic or aromatic polyols or polyepoxides, or mixtures thereof. Specific examples of polyols include those recited previously herein. Polyepoxides useful in preparing the polyether segments can include those resulting from the reaction of a polyol and epichlorohydrin. One or more of the polyols recited previously herein can be reacted with epichlorohydrin, so as to result in the formation of a polyepoxide. For purposes of non-limiting illustration, the polyether polymer can be prepared from: 4,4'-(propane-2,2-diyl)diphenol and the diglycidyl ether of 4,4'-(propane-2,2-diyl)diphenol; or 4,4'-(propane-2,2-diyl)dicyclohexanol and the diglycidyl ether of 4,4'-(propane-2,2-diyl)dicyclohexanol.

Reactants, reactant ratios, and reaction conditions should be selected to ensure that the resulting active hydrogen group-containing polyether polymer (ii) has a number average molecular weight of at least 1000 g/mole, and an equivalent weight of at least 500 g/mole.

The active hydrogen group-containing polymer (ii) having at least two active hydrogen groups per molecule can be an active hydrogen group-containing polyurethane polymer comprising two or more active hydrogen functional groups each independently selected from hydroxyl, thiol, primary amine, or secondary amine. Active hydrogen functionality can be independently introduced into the polyurethane polymer during formation thereof, or after formation thereof, in accordance with art-recognized methods.

Suitable active hydrogen group-containing polyurethane polymers can be prepared in accordance with art-recognized methods. For purposes of non-limiting illustration, suitable polyurethane polymers can be prepared from the reaction of a polyisocyanate having at least two isocyanate groups with a compound having at least hydroxyl groups, with an appropriate molar excess of active hydrogen groups, so as to form an active hydrogen functional polyurethane having at least two active hydrogen groups.

Examples of polyisocyanates useful in the preparation of such polyurethane polymers can include, but are not limited to, aliphatic, aromatic, cycloaliphatic and heterocyclic polyisocyanates, and mixtures of such polyisocyanates.

Further examples of polyisocyanates useful in the preparation of polyurethane polymers can include, but are not limited to, toluene-2,4-diisocyanate; toluene-2,6-diisocyanate; diphenyl methane-4,4'-diisocyanate; diphenyl methane-2,4'-diisocyanate; para-phenylene diisocyanate; biphenyl diisocyanate; 3,3'-dimethyl-4,4'-diphenylene diisocyanate; tetramethylene-1,4-diisocyanate; hexamethylene-1,6-diisocyanate; 2,2,4-trimethyl hexane-1,6-diisocyanate; 2,4,4-trimethyl hexane-1,6-diisocyanate; lysine methyl ester diisocyanate; bis(isocyanato ethyl)fumarate; isophorone diisocyanate; ethylene diisocyanate; dodecane-1,12-diisocyanate; cyclobutane-1,3-diisocyanate; cyclohexane-1,3-diisocyanate; cyclohexane-1,4-diisocyanate; methyl cyclohexyl diisocyanate; hexahydrotoluene-2,4-diisocyanate; hexahydrotoluene-2,6-diisocyanate; hexahydrophenylene-1,3-diisocyanate; hexahydrophenylene-1,4-diisocyanate; perhydrodiphenylmethane-2,4'-diisocyanate; perhydrodiphenylmethane-4,4'-diisocyanate; norbornane diisocyanate; and mixtures thereof.

Examples of polyols having at least two hydroxyl groups, from which the polyurethane polymers can be prepared, include, but are not limited to, those polyols recited previously herein, and mixtures thereof.

Suitable polyurethane polymers may also include thermoplastic polyurethanes (TPUs). As used herein, the term "thermoplastic" refers to a polymer which softens or becomes fluid upon heating and solidifies upon cooling, wherein these processes are able to be reversed and repeated without changing the chemical nature of the polymer. Non-limiting examples of suitable thermoplastic polyurethanes include polycarbonate TPUs, polyether TPUs and/or polyester TPUs, such as polycaprolactone TPUs.

Reactants, reactant ratios, and reaction conditions should be selected to ensure that the resulting active hydrogen group-containing polyurethane polymer (ii) has a number average molecular weight of at least 1000 g/mole, and an equivalent weight of at least 500 g/mole.

The active hydrogen group-containing polymer (ii) having at least two active hydrogen groups per molecule can be an active hydrogen group-containing acrylic polymer comprising two or more active hydrogen functional groups each independently selected from hydroxyl, thiol, primary amine, or secondary amine. Active hydrogen functionality can be independently introduced into the acrylic polymer during formation thereof, or after formation thereof, in accordance with art-recognized methods.

Suitable active hydrogen group-containing acrylic polymers can be prepared in accordance with art-recognized methods. For purposes of non-limiting illustration, suitable acrylic polymers can include acrylic polyols, acrylic polyamines, and combinations thereof.

For example, suitable acrylic polyols and acrylic polyamines can be prepared from hydroxyl and/or amine containing (meth)acrylates in combination with other ethylenically unsaturated co-monomers. Examples of hydroxyl containing (meth)acrylates can include, but are not limited to, hydroxyethyl(meth)acrylate, hydroxypropyl(meth)acrylate, hydroxybutyl(meth)acrylate, hydroxymethylethyl (meth)acrylate, hydroxymethylpropyl (meth)acrylate, and combination thereof. Examples of amine containing (meth) acrylates include, but are not limited to, methacryloyl-L-lysine, N-(3-aminopropyl)methacrylamide, 2-aminoethyl methacrylate, 2-(tert-butylamino)ethyl (meth)acrylate, N-(2-aminoethyl) methacrylamide, and combinations thereof. Non-limiting examples of suitable ethylenically unsaturated co-monomers can include alkyl esters of (meth) acrylic acid such as methyl (meth)acrylate, ethyl (meth) acrylate, butyl (meth)acrylate and 2-ethyl hexylacrylate, and vinyl aromatic compounds such as styrene, alpha-methyl styrene, and vinyl toluene.

Reactants, reactant ratios, and reaction conditions should be selected to ensure that the resulting active hydrogen group-containing acrylic polymer (ii) has a number average molecular weight of at least 1000 g/mole, and an equivalent weight of at least 500 g/mole.

Further, the active group-containing polymer (ii) having at least two active hydrogen groups per molecule can be a copolymer of any of the previously described active hydrogen group-containing polymers (ii), provided the resulting copolymer has a number average molecular weight of at least 1000 g/mole, and an equivalent weight of at least 500 g/mole. For example, the active hydrogen group-containing polymer (ii) can comprise at least one of a polycarbonate-polyester copolymer, a polycarbonate-polyurethane copolymer, a polyether-polyurethane copolymer, or a polycarbonate-polyester-polyurethane copolymer. Such copolymers suitable for use in the curable photochromic composition of the present invention as component (ii) can be prepared by art recognized methods provided that the resulting copolymers have at least two active hydrogen groups per molecule, a number average molecular weight of at least 1000 g/mole, and an equivalent weight of at least 500 g/mole.

Mixtures of any of the foregoing active hydrogen group-containing polymers (ii) having at least two active hydrogen groups per molecule can be used.

The active hydrogen group-containing polymer (ii) having at least two active hydrogen groups per molecule can be selected from the group consisting of polycarbonate polyols, polyester polyols, polyether polyols, polyurethane polyols, co-polymers thereof, and mixtures thereof.

The active hydrogen group-containing polymer (ii) can be present in the curable photochromic composition of the present invention in an amount ranging from 10 to 50 percent by weight, such as from 10 to 45 percent by weight, or from 15 to 40 percent by weight, or from 20 to 40 percent by weight, where weight percentages are based on total weight of solids in the curable photochromic composition.

The active hydrogen group-containing component (b) may further comprise (iii) a compound having at least three active hydrogen groups per molecule and an equivalent weight of less than or equal to 480 g/mole. The active hydrogen group-containing polymer (iii) can have an equivalent weight ranging from 150 to 480 g/mole, or from 200 to 450 g/mole, or from 250 to 450 g/mole.

The active hydrogen group-containing compound (iii) can comprise a lower molecular weight polyol, e.g., trimethylolpropane, trishydroxyethylisocyanurate, pentaerythritol, and/or the active hydrogen group-containing compound (iii) can comprise a polymeric polyol, e.g., an acrylic polyol or a vinyl polyol.

The active hydrogen group-containing compound (iii) can be selected from any of the active hydrogen group-containing acrylic polymers described above in regards to the active hydrogen group-containing polymer (ii), including copolymers thereof and mixtures thereof. Reactants, reactant ratios, and reaction conditions should be selected to ensure that the resulting active hydrogen group-containing acrylic polymer (iii) has at least three active hydrogen groups, e.g., hydroxyl groups, per molecule and an equivalent weight of less than or equal to 480 g/mole.

The active hydrogen group-containing compound (iii) can be selected from any of the active hydrogen group-containing vinyl polymers known in the art provided that the vinyl polymer has at least three active hydrogen groups, e.g., hydroxyl groups, per molecule and an equivalent weight of less than or equal to 480 g/mole. For example, suitable vinyl polyols can comprise any of those prepared by the reaction of vinyl alcohol with one or more compounds which are free of hydroxyl functionality, such as alkyl esters of (meth) acrylic acid, e.g., methyl (meth)acrylate, ethyl (meth)acrylate, butyl (meth)acrylate and 2-ethyl hexylacrylate; vinyl aromatic compounds, e.g., styrene, alpha-methyl styrene, p chloromethylstyrene; divinyl benzene; vinyl naphthalene, and divinyl naphthalene, and vinyl toluene; and vinyl esters of carboxylic esters, e.g., vinyl acetate, vinyl butyrate, vinyl 3,4-dimethoxybenzoate, and vinyl benzoate.

The active hydrogen group-containing polymer (iii) can be present in the curable photochromic composition of the present invention in an amount ranging from 0 to 10 percent by weight, such as from 0.1 to 10 percent by weight, or from 1 to 10 percent by weight, or from 1 to 5 percent by weight, where weight percentages are based on total weight of solids in the curable photochromic composition.

As mentioned above, the curable photochromic compositions of the present invention comprises (c) a curing agent comprising functional groups which are reactive with active hydrogen groups. For example, the curing agent (c) can be selected from the group consisting of polyisocyanates, polyisothiocyanates, aminoplasts, polyepoxides, alkoxysilanes, and polyanhydrides. Mixtures of such curing agents can be used where appropriate.

As used herein, in the specification and the claims, the term “polyisocyanate” includes both unblocked polyisocyanate and blocked polyisocyanate as described in detail herein below.

Polyisocyanates suitable for use as the curing agent (c) includes at least two isocyanate groups (—NCO). Examples of isocyanate functional materials from which the polyisocyanate curing agent can be selected can include, but are not limited to, toluene-2,4-diisocyanate; toluene-2,6-diisocyanate; diphenyl methane-4,4'-diisocyanate; diphenyl methane-2,4'-diisocyanate; para-phenylene diisocyanate; biphenyl diisocyanate; 3,3'-dimethyl-4,4'-diphenylene diisocyanate; tetramethylene-1,4-diisocyanate; hexamethylene-1,6-diisocyanate; 2,2,4-trimethyl hexane-1,6-diisocyanate; lysine methyl ester diisocyanate; bis(isocyanato ethyl) fumarate; isophorone diisocyanate; ethylene diisocyanate; dodecane-1,12-diisocyanate; cyclobutane-1,3-diisocyanate; cyclohexane-1,3-diisocyanate; cyclohexane-1,4-diisocyanate; methyl cyclohexyl diisocyanate; hexahydrotoluene-2,4-diisocyanate; hexahydrotoluene-2,6-diisocyanate; hexahydrophenylene-1,3-diisocyanate; hexahydrophenylene-1,4-diisocyanate; perhydrodiphenylmethane-2,4'- diisocyanate; perhydrodiphenylmethane-4,4'-diisocyanate; norbornane diisocyanate; and mixtures thereof.

The polyisocyanate curing agent can be selected from polyisocyanates prepared from dimers and trimers of diisocyanate monomers. Dimers and trimers of diisocyanate monomers can be prepared by art-recognized methods, such as described in U.S. Pat. No. 5,777,061 at column 3, line 44 through column 4, line 40. Dimers and trimers of the above recited diisocyanate monomers can contain linkages selected from the group consisting of isocyanurate, uretdione, biuret, allophanate and combinations thereof.

The polyisocyanate curing agent also can be selected from an oligomeric polyisocyanate functional adduct. The oligomeric polyisocyanate functional adduct can contain structural linkages selected from urethane (—NH—C(O)—O—), thiourethane (—NH—C(O)—S—), urea (—N($R^1$)—C(O)—N($R^1$)—, where each $R^1$ is independently as described previously herein), or combinations of such structural linkages.

As used herein, by “oligomeric polyisocyanate functional adduct” is meant a material that is substantially free of polymeric chain extension. Oligomeric polyisocyanate functional adducts can be prepared by art-recognized methods, for example, from a compound containing three or more active hydrogen groups, such as trimethylolpropane (TMP), and an isocyanate monomer, such as 1-isocyanato-3,3,5-trimethyl-5-isocyanatomethylcyclohexane (IPDI), in a molar ratio of 1:3, respectively. In the case of TMP and IPDI, by employing art-recognized starved feed and/or dilute solution synthesis techniques, an oligomeric adduct having an average isocyanate functionality of 3 can be prepared (“TMP-3IPDI”).

The active hydrogen group containing compound, used to prepare the oligomeric polyisocyanate functional adduct, can be aliphatic, such as TMP, trishydroxyisocyanurate, pentaerythritol, and trimethylolpropane tris(mercaptoacetate). The isocyanate monomer used to prepare the oligomeric polyisocyanate functional can be a diisocyanate monomer, for example, any of those described previously herein.

The isocyanate groups of the polyisocyanate curing agent can be blocked with a blocking agent. After exposure to elevated temperature, the blocking agent separates from the isocyanate functional material, allowing the free/unblocked isocyanate groups thereof to react and form covalent bonds with the active hydrogen groups of the active hydrogen group-containing components present in the curable photochromic composition. After unblocking from the polyisocyanate, the blocking agent can volatize out of the composition (prior to the composition becoming vitrified) and/or remain in the composition, such as a plasticizer. It is desirable that the blocking agent not form bubbles in the composition and/or overly plasticize the composition after de-blocking.

The blocking groups of the blocked polyisocyanate curing agent can be selected from hydroxy functional compounds, 1H-azoles, lactams, ketoximes, or mixtures thereof. Classes of hydroxy functional compounds can include, but are not limited to, aliphatic, cycloaliphatic, or aromatic alkyl monoalcohols or phenolics. Specific examples of hydroxy functional compounds useful as blocking agents include, but are not limited to, lower aliphatic alcohols such as methanol, ethanol, and n-butanol; cycloaliphatic alcohols such as cyclohexanol and tetrahydrofuran; aromatic-alkyl alcohols, such as phenyl carbinol and methylphenyl carbinol; and glycol ethers, e.g., ethylene glycol butyl ether, diethylene glycol butyl ether, ethylene glycol methyl ether and propylene glycol methyl ether. The hydroxy functional blocking groups can include phenolics, examples of which include, but are not limited to, phenol itself and substituted phenols, such as cresol, nitrophenol and p-hydroxy methylbenzoate.

Examples of 1H-azoles that are useful as blocking groups can include, but are not limited to, 1H-imidazole, 1H-pyrazole, 1H-dialkyl pyrazoles (such as 1H-3,5-dimethyl pyrazole and 1H-2,5-dimethyl pyrazole), 1H-1,2,3-triazole, 1H-1,2,3-benzotriazole, 1H-1,2,4-triazole, 1H-5-methyl-1,2,4-triazole, and 1H-3-amino-1,2,4-triazole.

Ketoximes useful as blocking groups can include those prepared from aliphatic or cycloaliphatic ketones. Examples of ketoxime blocking groups include, but are limited to, 2-propanone oxime (acetone oxime), 2-butanone oxime (also referred to as methylethyl ketoxime), 2-pentanone oxime, 3-pentanone oxime, 3-methyl-2-butanone oxime, 4-methyl-2-pentanone oxime, 3,3-dimethyl-2-butanone oxime, 2-heptanone oxime, 3-heptanone oxime, 4-heptanone oxime, 5-methyl-3-heptanone oxime, 2,6-dimethyl-4-heptanone oxime, cyclopentanone oxime, cyclohexanone oxime, 3-methylcyclohexanone oxime, 3,3,5-trimethylcyclohexanone oxime, and 3,5,5-trimethyl-2-cyclohexene-5-one oxime.

Examples of lactam blocking groups can include, but are not limited to, e-caprolactam and 2-pyrolidinone. Other suitable blocking groups include morpholine, 3-aminopropyl morpholine, and N-hydroxy phthalimide.

In the curable photochromic compositions of the present invention, at least some of the reactive functional groups of the curing agent can be blocked with a blocking group, and each blocking group can be independently selected from the group consisting of methylethyl ketoxime, pyrazole (more particularly, 1H-pyrazole), and dialkyl pyrazole (more particularly, 1H-dialkyl pyrazole).

The polyisothiocyanate curing agent, of the curable photochromic compositions of the present invention, generally includes at least two isothiocyanate groups (—NCS). Suitable polyisothiocyanate curing agents can be selected from those classes and examples of polyisocyanate curing agents described previously herein (including those in which the isocyanate groups are blocked or unblocked), in which the isocyanate groups (—NCO) thereof are replaced with isothiocyanate groups (—NCS).

The curable photochromic composition of the present invention may also include one or more cure catalysts for catalyzing the reaction between the isocyanate groups and/or isothiocyanate groups of the polyisocyanate curing agent and/or polyisothiocyanate curing agent and the active hydrogen groups of the segmented polymer. Classes of useful catalysts include, but are not limited to, metal compounds, such as, but not limited to, organic tin compounds, organic bismuth compounds, organic zinc compounds, organic zirconium compounds, organic aluminum compounds, organic nickel compounds, organic mercury compounds, and alkali metal compounds; and amine compounds, such as tertiary amine compounds, and quaternary ammonium compounds. Examples of organic tin compounds include, but are not limited to, tin(II) salts of carboxylic acids, such as tin(II) acetate, tin(II) octanoate, tin(II) ethylhexanoate and tin(II) laurate; tin(IV) compounds, such as dibutyltin oxide, dibutyltin dichloride, dibutyltin diacetate, dibutyltin dilaurate, dibutyltin maleate and dioctyltin diacetate. Examples of suitable tertiary amine catalysts include, but are not limited to, diazabicyclo[2.2.2]octane and 1,5-diazabicyclo[4,3,0]non-5-ene. Examples of organic bismuth compounds include, but are not limited to, bismuth carboxylates. Examples of alkali metal compounds include, but are not limited to, alkali metal carboxylates, such as, but not limited to, potassium acetate, and potassium 2-ethylhexanoate. Examples of quaternary ammonium compounds include, but are not limited to, N-hydroxyalkyl quaternary ammonium carboxylates. The catalyst can be selected from tin(II) octanoate, dibutyltin(IV) dilaurate, and/or bismuth 2-ethylhexanoate.

The curing agent (c) of the curable photochromic compositions of the present invention also can be an aminoplast curing agent. The aminoplast curing agent can be selected from art-recognized aminoplast curing agents. Examples of suitable aminoplast curing agents include, but are not limited to, aminoplasts containing methylol and/or methylol ether groups.

Aminoplasts are typically obtained from the reaction of formaldehyde with an amine or amide. Examples of amines or amides include, but are not limited to, melamine, urea, and/or benzoguanamine. Condensates with other amines or amides can also be used, such as aldehyde condensates of glycoluril, which give a high melting crystalline product which is useful in powder coatings. While formaldehyde is typically used to prepare aminoplast crosslinking agents, other aldehydes can be used, such as acetaldehyde, crotonaldehyde, and/or benzaldehyde.

The aminoplast curing agents typically contain methylol groups. At least a portion of these methylol groups typically are etherified with an alcohol to modify the cure response. Any monohydric alcohol may be employed for this purpose, examples of which include, but are not limited to, methanol, ethanol, butanol, isobutanol, and/or hexanol. The aminoplast curing agents can be selected from melamine-, urea-, and/or benzoguanamine-formaldehyde condensates etherified with an alcohol containing from one to four carbon atoms.

When an aminoplast curing agent is present, the curable photochromic compositions of the present invention can include one or more catalysts to accelerate the cure of the aminoplast curing agent with the active hydrogen groups of the polymers present in the active hydrogen group-containing component (b). Suitable catalysts for aminoplast cure include, but are not limited to, acids such as acid phosphates and sulfonic acids or substituted sulfonic acids. Examples include dodecylbenzene sulfonic acid, paratoluene sulfonic acid, phenyl acid phosphate, ethylhexyl acid phosphate, and the like. The catalyst typically is present in an amount of about 0.05 to about 5.0 percent by weight, or about 0.1 to about 1.0 percent by weight, based on the total weight of solids in the curable photochromic composition.

The curing agent (c) of the curable photochromic compositions of the present invention also can comprise any of a wide variety of art-recognized polyepoxides. The polyepoxides suitable for use as the current agent (c) have two or more epoxy groups per molecule. Suitable polyepoxides may be saturated or unsaturated, aliphatic, cycloaliphatic, aromatic, or heterocyclic.

Non-limiting examples of useful polyepoxides can include polyglycidyl ethers of aromatic polyols, e.g., polyphenols. Such polyepoxides can be produced, for example, by etherification of an aromatic polyol with epichlorohydrin or dichlorohydrin in the presence of an alkali. The aromatic polyol may be, e.g., bis(4-hydroxyphenyl)-2,2-propane (generally known as bisphenol A), bis(4-hydroxyphenyl)-1,1-ethane, bis(4-hydroxyphenyl)-1,1-isobutane, bis(4-hydroxytertiarybutylphenyl)-2,2-propane, bis(2-hydroxynaphthyl)methane, 4,4'-dihydroxybenzophenone, 1,5-dihydroxynaphthalene and the like.

Also suitable are polyglycidyl ethers of polyhydric aliphatic alcohols, such as 1,2-ethanediol, 1,2-propanediol, 1,3-propanediol, 1,4-butanediol, 1,5-pentanediol, diethylene glycol, triethylene glycol, polyethylene glycol, polypropylene glycol and the like. Similarly, the polyhydric aliphatic alcohols may be a hydrogenated polyphenol, such as 2,2-bis(4-hydroxycyclohexyl)propane and the like.

Examples of other polyepoxides suitable for use as the curing agent (c) can include, but are not limited to, polyglycidyl esters of polycarboxylic acids. These compounds may be formed by reacting epichlorohydrin or another epoxy material with an aliphatic or aromatic polycarboxylic acid, such as succinic acid, adipic acid, azelaic acid, sebacic acid, maleic acid, 2,6-naphthalene dicarboxylic acid, fumaric acid, phthalic acid, tetrahydrophthalic acid, hexahydrophthalic acid, or trimellitic acid.

Polyepoxides derived from the epoxidation of an olefinically unsaturated alicyclic compound are also suitable for use as the curing agent (c) in the curable photochromic composition of the present invention. These polyepoxides are nonphenolic and are obtained by epoxidation of alicyclic olefins with, for example, oxygen, perbenzoic acid, acid-aldehyde monoperacetate, or peracetic acid. Such polyepoxides include epoxy alicyclic ethers and esters as are well known in the art.

Epoxy novolac resins also can be used as the curing agent (c) in the curable photochromic composition of the present invention. These resins are obtained by reacting an epihalohydrin with the condensation product of aldehyde and monohydric or polyhydric phenols. A typical example is the reaction product of epichlorohydrin with a phenol-formaldehyde condensate.

Mixtures of any of the aforementioned polyepoxides can be used as the curing agent (c) in the curable photochromic compositions of the present invention.

When a polyepoxide is used as the curing agent (c) in the curable photochromic compositions of the present invention, a suitable catalyst may be used to effect the epoxy ring opening reaction.

The curing agent (c) of the curable photochromic composition of the present invention also can comprise any of a wide variety of art-recognized alkoxysilanes. Suitable alkoxysilane materials can include those having two or more alkoxysilane functionalities. Specific non-limiting examples can include Bis(3-(methylamino)propyl)trimethoxysilane, 1,2-Bis(trimethoxysilyl)ethane, 2-(trimethoxysilyl)-5-[2-(trimethoxysilyl)ethyl]Bicyclo[2.2.1] heptane, 1,2,4-tris[2-(trimethoxysilyl)ethyl]Cyclohexane 1,6-Bis(trimethoxysilyl)hexane, 1,6-Bis(trimethoxysilyl)-2,5-dimethylhexane and 1,8-Bis(triethoxysilyl)octane.

Suitable poly(trialkoxysilane) functional materials may be synthesized through art-recognized methods. The reaction of a polyol compound with an isocyanate group-containing trialkoxysilane, such as 3-(triethoxysilyl)propyl isocyanate, results in the formation of poly(trialkoxysilane) materials. Alternatively, an amine functional trialkoxysilane, such as (3-aminopropyl)triethoxysilane, may be reacted with polyisocyanate to form poly(trialkoxysilane) terminal materials. Suitable commercially available examples of such materials include VESTANAT® EP-M grades and VESTANAT® EP-MF grades available from Evonik Industries.

When alkoxysilane is used as the curing agent (c) in the curable photochromic compositions of the present invention, a suitable acidic or basic catalyst may be used to effect the condensation reaction between the alkoxysilane groups and the active hydrogen groups present in the curable composition.

The curing agent (c) of the curable photochromic compositions of the present invention also can comprise a poly(anhydride) curing agent. For purposes of the present invention, "poly(anhydride)" refers to a molecule having two or more anhydride groups. Suitable non-limiting examples of poly(anhydride) curing agents can include those having at least three cyclic anhydride groups per molecule.

Suitable poly(anhydride) curing agents can be prepared by free-radical initiated addition polymerization of an ethylenically unsaturated monomer having anhydride functionality such as maleic anhydride, citraconic anhydride, itaconic anhydride, propenyl succinic anhydride and the like, with other ethylenically unsaturated monomers substantially free of anhydride functionality. Examples of such ethylenically unsaturated materials can include, but are not limited to, esters of (meth)acrylic acids, such as methyl acrylate, methyl methacrylate, butyl acrylate and butyl methacrylate; vinyl compounds such as vinyl acetate and vinyl chloride; styrene-based materials such as styrene itself and alpha-methylstyrene; allyl compounds such as allyl chloride and allyl acetate and other co-polymerizable ethylenically unsaturated monomers such as acrylonitrile and methacrylonitrile, amides such as acrylamide and methacrylamide, dienes such as 1,3-butadiene, $C_2$-$C_{24}$ olefins, and mixtures of such ethylenically unsaturated materials.

A "cyclic anhydride", as used herein, refers to a molecule comprising at least one closed ring structure, wherein the closed ring structure comprises an anhydride group. The poly(anhydride) may comprise at least three cyclic anhydride groups per molecule. The poly(anhydride) comprising at least three cyclic anhydride groups may be prepared from a cyclic anhydride monomer, such as maleic anhydride. The poly(anhydride) may comprise a copolymer of maleic anhydride. The poly(anhydride) can comprise at least one copolymer selected from the group consisting of a copolymer of maleic anhydride and a $C_2$-$C_{24}$ olefin, a copolymer of maleic anhydride and (meth)acrylate, a copolymer of maleic anhydride and styrene or a derivative thereof, and mixtures thereof. The poly(anhydride) can comprise a copolymer of maleic anhydride and a $C_2$-$C_{24}$ olefin, such as a $C_{10}$-$C_{24}$ olefin, a $C_{10}$-$C_{20}$ olefin, a $C_{15}$-$C_{24}$ olefin, or a $C_{15}$-$C_{20}$ olefin. For example, the poly(anhydride) may comprise a copolymer of maleic anhydride and 1-octadecene.

The poly(anhydride) may have a number average molecular weight (Mn) of at least 500, at least 1,000, at least 5,000, at least 10,000, or at least 25,000 g/mole. Also, the poly (anhydride) may have a Mn of less than 100,000, less than 75,000, less than 60,000, or less than 50,000 g/mole. The poly(anhydride) suitable for use as the curing agent (c), may have a Mn within the range of from 500 to 100,000, from 1,000 to 100,000, from 5,000 to 75,000, from 10,000 to 60,000, from 25,000 to 60,000, or from 25,000 to 50,000 g/mole.

The curing agent (c) can be present in the curable photochromic composition of the present invention in an amount ranging from 2 to 80 percent by weight, or from 5 to 70 percent by weight, or from 10 to 70 percent by weight, or from 20 to 70 percent by weight, the percent weights in each case being based on total weight of solids of the curable photochromic composition, and inclusive of the recited values.

The curable photochromic compositions according to the present invention can further include any of a number of additives that aid or assist in the processing and/or performance of the compositions or articles. Non-limiting examples of such additives can include photoinitiators, thermal initiators, polymerization inhibitors, solvents, light stabilizers (such as, but not limited to, ultraviolet light absorbers and light stabilizers, such as hindered amine light stabilizers (HALS)), antioxidants heat stabilizers, mold release agents, rheology control agents, leveling agents (such as, but not limited to, surfactants), free radical scavengers, adhesion promoters (such as hexanediol diacrylate and coupling agents), plasticizers, and combinations and mixtures thereof. These optional additives are well-known in the art and, when used, typically are present in amounts of up to 20 percent by weight (e.g., from 0.5 to 10 percent by weight), based on total weight of resin solids of the curable photochromic composition.

The curable photochromic compositions of the present invention can further include one or more fixed-tint dyes. As used herein, the term "fixed-tint dye" and related terms, such as "fixed-colorant", "static colorant", "fixed dye", and "static dye" means dyes that are non-photosensitive materials, which do not physically or chemically respond to electromagnetic radiation with regard to the visually observed color thereof. The term "fixed-tint dye" and related terms as used herein does not include and is distinguishable from photochromic compound. As used herein, the term "non-photosensitive materials" means materials that do not physically or chemically respond to electromagnetic radiation with regard to the visually observed color thereof, including, but not limited to, fixed-tint dyes.

One or more fixed-tint dyes can be present in the curable photochromic compositions of the present invention for purposes including, but not limited to, providing a cured article prepared from the curable photochromic compositions with at least a base (or first) color characteristic of the fixed-tint dye, when the photochromic compound is not activated; and optionally a second color characteristic of the combination of the fixed-tint dye and the photochromic compound when activated, such as by exposed to actinic radiation.

The optional fixed-tint dye can comprise at least one of azo dyes, anthraquinone dyes, xanthene dyes, azime dyes, iodine, iodide salts, polyazo dyes, stilbene dyes, pyrazolone dyes, triphenylmethane dyes, quinoline dyes, oxazine dyes, thiazine dyes, or polyene dyes.

The fixed-tint dye can be present in the curable photochromic composition in varying amounts to provide the intended effect in the cured article prepared therefrom. For example, the fixed-tint dye can be present in the curable photochromic composition in an amount of from 0.001 to 15 percent by weight, or from 0.01 to 10 percent by weight, or from 0.1 to 2.5 percent by weight, the percent weights in each case being based on the total solids weight of the curable photochromic composition (including the weight of the fixed-tint dye; and inclusive of the recited values).

The curable photochromic compositions of the present invention can include solvents such as those selected from water, organic solvents, and combinations thereof. Classes of organic solvents that can be present in the curable photochromic compositions of the present invention include, but are not limited to, ketones, such as acetone, and methyl ethyl ketone; ethers, such as dimethyl ether and methyl ethyl ether; cyclic ethers, such as tetrahydrofuran and dioxane; glycol ethers; esters, such as ethyl acetate, ethyl lactate, ethylene carbonate and propylene carbonate; nitrogen containing cyclic compounds, such as pyrrolidone, N-methyl-2-pyrrolidone and 1,3-dimethyl-2-imidazolidinone; sulfur containing compounds, such as dimethyl sulfoxide and tetramethylene sulfone; aromatic compounds, such as toluene, xylene, anisole, and butyl benzoate; and mixtures of aromatic compounds, such as, but not limited to, Aromatic 100 Fluid, which is a commercially available mixture of $C_9$-$C_{10}$ dialkyl- and trialkyl-benzenes.

Solvent(s) can be present in the curable photochromic compositions of the present invention in an amount of from 5 to 95 percent by weight, or from 15 to 80 percent by weight, or from 30 to 80 percent by weight, in each case based on the total weight of the curable photochromic composition (including the weight of the solvent).

The present invention also is directed to an article comprising: (A) a substrate; and (B) a photochromic layer over at least a portion of the substrate, wherein the photochromic layer is formed from any of the curable photochromic compositions described above. The article of the present invention can be selected from the group consisting of ophthalmic articles, display articles, windows, mirrors, active liquid crystal cell articles, and passive liquid crystal cell articles. Also, the article of the present invention can be an ophthalmic article which is selected from the group consisting of corrective lenses, non-corrective lenses, contact lenses, intra-ocular lenses, magnifying lenses, protective lenses, and visors. Further, the article of the present invention can be a display article which is selected from the group consisting of screens, monitors, and security elements. Correspondingly, the substrate (A) of the article can be selected from ophthalmic substrates, displays, windows, or mirrors.

Non-limiting examples of organic materials that can be used to form the substrate of the articles of the present invention include polymeric materials, for example, homopolymers and/or copolymers, prepared from the monomers and mixtures of monomers disclosed in U.S. Pat. No. 5,962,617 and in U.S. Pat. No. 5,658,501 from column 15, line 28 to column 16, line 17, the disclosures of which U.S. patents are specifically incorporated herein by reference. For example, such polymeric materials can be thermoplastic or thermoset polymeric materials, can be transparent or optically clear, and can have any refractive index required. Non-limiting examples of such disclosed monomers and polymers include polyol(allyl carbonate) monomers, e.g., allyl diglycol carbonates such as diethylene glycol bis(allyl carbonate), which monomer is sold under the trademark CR-39 by PPG Industries, Inc.; polyurea-polyurethane (polyurea-urethane) polymers, which are prepared, for example, by the reaction of a polyurethane prepolymer and a diamine curing agent, a composition for one such polymer being sold under the trademark TRIVEX by PPG Industries, Inc.; polyol(meth)acryloyl terminated carbonate monomer; diethylene glycol dimethacrylate monomers; ethoxylated phenol methacrylate monomers; diisopropenyl benzene monomers; ethoxylated trimethylol propane triacrylate monomers; ethylene glycol bismethacrylate monomers; poly (ethylene glycol) bismethacrylate monomers; urethane acrylate monomers; poly(ethoxylated bisphenol A dimethacrylate); poly(vinyl acetate); poly(vinyl alcohol); poly(vinyl chloride); poly(vinylidene chloride); polyethylene; polypropylene; polyurethanes; polythiourethanes; thermoplastic polycarbonates, such as the carbonate-linked resin derived from bisphenol A and phosgene, one such material being sold under the trademark LEXAN; polyesters, such as the material sold under the trademark MYLAR; poly(ethylene terephthalate); polyvinyl butyral; poly(methyl methacrylate), such as the material sold under the trademark PLEXIGLAS, and polymers prepared by reacting polyfunctional isocyanates with polythiols or polyepisulfide monomers, either homopolymerized or co- and/or terpolymerized with polythiols, polyisocyanates, polyisothiocyanates and optionally ethylenically unsaturated monomers or halogenated aromatic-containing vinyl monomers. Also contemplated are copolymers of such monomers and blends of the described polymers and copolymers with other polymers, for example, to form block copolymers or interpenetrating network products.

For example, the substrate (A) can comprise a polymeric material selected from the group consisting of polycarbonate, polycyclic alkene, polyurethane, poly(urea)urethane, polythiourethane, polythio(urea)urethane, polyurea, poly(allyl carbonate) polymers, cellulose acetate, cellulose diacetate, cellulose triacetate, cellulose acetate propionate, cellulose acetate poly(vinylidene chloride), poly(ethylene terephthalate), polyester, polysulfone, polyolefin, copolymers thereof, and mixtures thereof.

The substrate optionally can include a photochromic material and/or a fixed-tint dye, which can each be selected from those classes and examples of photochromic materials and fixed-tint dyes as described previously herein. The optional photochromic material(s) or compound(s) present in the substrate can be the same or different than the photochromic material(s) present in the photochromic layer. The optional fixed-tint dye(s) can be the same or different than the optional fixed-tint dye(s) of the photochromic layer.

The photochromic layer of the article can be a photochromic coating and/or a photochromic film (or sheet). The photochromic film or sheet can be formed in accordance with art-recognized methods, such as, but not limited to, extrusion and casting methods. The photochromic layer of the article can be a photochromic coating layer formed from the curable photochromic composition of the present invention. The curable photochromic coating composition can be applied to the substrate in accordance with art-recognized methods, which include, but are not limited to, spray application methods, curtain coating application methods, drawdown blade (or bar) application methods, dip-coating application methods, spin-coating application methods, jet printing methods (such as inkjet printing methods, where the "ink" is replaced with a curable photochromic composition according to the present invention), and combinations thereof.

The curable photochromic compositions of the present invention can be used to prepare photochromic layers, such as photochromic coating layers and photochromic films (or sheets). As used herein, the term "coating" means a cured layer that is not self-supporting, which generally is formed from a liquid composition which is applied and adherent to a substrate, and which may or may not have a uniform thickness. As used herein, the term "film" (or "sheet") means a cured polymeric layer that is self-supporting (i.e., free-standing) and which has a substantially uniform thickness.

The curable photochromic composition of the present invention can be cured by any suitable method. The curable photochromic composition can be cured at ambient conditions, such as at room temperature of about 25° C. Alternatively, the curable photochromic composition can be cured by exposure to elevated temperature (in excess of ambient room temperature). As used herein, by "cured" is meant a three dimensional crosslink network is formed by covalent bond formation, such as between the active hydrogen groups of the segmented polymer and the reactive functional groups of the curing agent. When cured at elevated temperature, the curable photochromic composition can be referred to herein as a thermosetting curable photochromic composition. The temperature at which the thermosetting curable photochromic composition of the present invention is cured is variable and depends in part on the amount of time during which curing is conducted. The curable photochromic composition of the present invention can be cured at an elevated temperature of from 90° C. to 204° C., or from 100° ° C. to 177° C., or from 110° C. to 140° C. for a period of 20 to 240 minutes.

The photochromic coating layer can be in the form of a single layer or multiple layers. When in the form of multiple layers, each layer of the photochromic layer can be prepared from curable photochromic compositions according to the present invention, having the same or different compositions, such as the same or different photochromic compound (s).

The photochromic layer can have any suitable thickness, such as from 10 micrometers to 250 micrometers, or from 15 micrometers to 75 micrometers.

In addition to the photochromic layer, the article optionally can include one or more further art-recognized layers, such as, but not limited to, a primer layer(s); an adhesive layer(s); a protective layer(s) (such as a hard-coat layer); a polarizing layer(s); a birefringent layer(s); an antireflective layer(s); and/or another photochromic layer(s) that is prepared from a composition other than the curable photochromic composition of the present invention.

The present invention further relates to a photochromic multilayer article comprising at least one photochromic layer formed from any of the previously described curable photochromic compositions. Each layer of the photochromic multilayer article can independently be in the form of a coating or in the form of a film/sheet. The photochromic multilayer article can include two or more layers that are formed from the same or different curable photochromic compositions of the present invention.

The multilayer article of the present invention optionally can include one or more further art-recognized layers, such as, but not limited to, an adhesive layer(s); a protective layer(s) (such as a hard-coat layer or one or more polymeric film layers) a polarizing layer(s); a birefringent layer(s); an antireflective layer(s); and/or another photochromic layer(s) that is prepared from a composition other than the curable photochromic composition of the present invention.

The multilayer article of the present invention can have any suitable thickness, such as from 10 micrometers to 1,000 micrometers, or from 15 micrometers to 750 micrometers, or from 25 to 100 micrometers.

The multilayer article of the present invention can be used alone or in conjunction with another article, such as a substrate. The substrate can be selected from those classes and examples of substrates as described previously herein with regard to the article of the present invention, such as ophthalmic substrates, displays, windows, and/or mirrors. The substrate can be composed of one or more suitable materials, including, but not limited to, organic materials, such as organic polymeric materials; glasses, such as silica-based glasses; metals; ceramic materials; and combinations thereof.

The multilayer article of the present invention can be adhered to a surface of a substrate by art-recognized methods, such as, but not limited to, static clinging, such as with static electricity; one or more interposed adhesive layers; fusion bonding, such as thermal fusion bonding; and in-mold formation, such as where the multilayer article is placed in a mold, and the substrate is formed against at least one surface of the multilayer article within the mold.

The present invention can be further characterized by one or more of the following non-limiting clauses.

Clause 1: A multilayer article comprising:
(A) a substrate; and
(B) at least one photochromic layer over at least a portion of the substrate, wherein the photochromic layer is formed from a curable photochromic composition comprising:
(a) at least one photochromic material;
(b) an active hydrogen group-containing component comprising:
(i) an active hydrogen group-containing fluorinated polymer having an active hydrogen group equivalent weight ranging from 200 to 5000 g/mole and a number average molecular weight ranging from 5,000 to 50,000 g/mole, and
(ii) a polymer having at least two active hydrogen groups per molecule, a number average molecular weight of at least 1000 g/mole, and an equivalent weight of at least 500 g/mole; and
(c) a curing agent comprising functional groups which are reactive with active hydrogen groups.

Clause 2: The multilayer article of clause 1, wherein two or more photochromic layers are formed over the substrate (A) from the same or different curable photochromic compositions Clause 3: The multilayer article of clause 1 or clause 2, wherein the active hydrogen group-containing component (b) further comprises: (iii) a compound having at least 3 active hydrogen groups per molecule and an equivalent weight of less than or equal to 480 g/mole.

Clause 4: The multilayer article of any one of clauses 1 to 3, wherein the photochromic layer(s) are in the form of a coating or in the form of a film.

The present invention is more particularly described in the following examples, which are intended to be illustrative only, since numerous modifications and variations therein will be apparent to those skilled in the art. Unless otherwise specified, all parts and all percentages are by weight.

EXAMPLES

Part 1. Preparation of Curable Compositions

Example 1 and Comparative Example 2

Curable coating compositions were prepared using the components listed in Table 1, shown in parts by weight. For each composition, the components of Charge 1 were combined and heated to 60° C., stirred until the solids dissolved completely, approximately 30 minutes. Charge 2 was added, stirring continuously for one hour at 60° C. The solution was cooled to room temperature and Charge 3 was added, followed by stirring for one hour.

TABLE 1

| | Example 1 | Comparative Example 2 (CE-2) |
|---|---|---|
| Charge 1 | | |
| Photochromic dye blend 1[i] | 6.00 | 6.01 |
| TINUVIN ® 144[ii] | 2.00 | 2.02 |
| IRGANOX ® 245[iii] | 2.00 | 2.02 |
| (3-Glycidoxypropyl) trimethoxysilane | 4.54 | 4.54 |
| BYK ® 333[iv] | 0.08 | 0.08 |
| N-methyl pyrrolidinone | 51.85 | 53.43 |
| Charge 2 | | |
| LUMIFLON ® LF916F[v] | 3.3 | — |

TABLE 1-continued

| | Example 1 | Comparative Example 2 (CE-2) |
|---|---|---|
| Charge 3 | | |
| TRIXENE ® BI-7960[vi] | 96.1 | 91.3 |
| ETERNACOL ® PH300D[vii] | 25.4 | 32.2 |
| Acrylic polyol[viii] | 4.0 | 3.8 |
| Dibutyltin dilaurate | 0.26 | 0.26 |

[i]Blend of photochromic indenofused naphthopyran dyes formulated to give a grey color on activation(dye package-1).

[ii]Hindered amine light stabilizer, commercially available from BASF.

[iii]Antioxidant commercially available from BASF.

[iv]Polyether modified dimethylpolysiloxane copolymer, available from BYK-Chemie.

[v]Fluoroethylene vinyl ether with a reported hydroxyl equivalent weight of 550 g/mole, and a number average molecular weight (Mn) of 18,000 g/mole as determined by GPC with polystyrene standard and tetrahydrofuran diluent.

[vi]Blocked hexamethylene diisocyanate biuret available from Baxenden Chemical Co. with an isocyanate equivalent weight (on solids) of 287 g/mole, provided at 70% solids in propylene glycol monomethyl ether.

[vii]Polycarbonate diol with an average hydroxy equivalent weight of 1516 g/mole, commercially available from Ube Americas Inc.

[viii]Prepared from free radical polymerization of Hydroxypropyl methacrylate (40.4%), Butyl methacrylate (57.6%) and Acrylic acid (2.0%) with a number average molecular weight (Mn) of 5500 as determined by GPC with polystyrene standard and tetrahydrofuran (THF) diluent. Hydroxyl equivalent weight (on solids) of 360 g/mole. Provided at 61% solids in dipropylene glycol methyl ether acetate.

Example 3 and Comparative Example 4

Photochromic compositions of Example 3 and the Comparative Example 4 were prepared using a thermoplastic polyurethane diol as shown in Table 2 below, using the procedures described above for Example 1 and Comparative Example 2. Each of the final solutions was stirred for 16 hours prior to using.

TABLE 2

| | Example 3 | Comparative Example 4 (CE-4) |
|---|---|---|
| Charge 1 | | |
| Photochromic dye blend 1 | 8.14 | 8.14 |
| TINUVIN ® 144 | 2.04 | 2.04 |
| IRGANOX ® 245 | 2.04 | 2.04 |
| (3-Glycidoxypropyl) trimethoxysilane | 4.50 | 4.50 |
| BYK ® 333 | 0.08 | 0.08 |
| N-methyl pyrrolidinone | 444.83 | 444.83 |
| Charge 2 | | |
| LUMIFLON ® LF916F | 4.4 | — |
| Charge 3 | | |
| TRIXENE ® BI-7960 | 74.5 | 74.5 |
| CARBOTHANE ™ PC-3575A [ix] | 43.4 | 43.4 |
| Dibutyltin dilaurate | 0.29 | 0.29 |

[ix] Thermoplastic polyurethane diol available from The Lubrizol Corporation, with a measured Mn of 39,460 g/mole (determined using GPC-triple detectors-MALS/RI/VIS analysis using THE solvent).

Examples 5 and 7 and Comparative Examples 6 and 8

Coating compositions of Examples 5 and 7, and Comparative Example 6 (CE-6) and Comparative Example 8 (CE-8) were prepared using the components listed in Table 3 below, shown in parts by weight. For each composition, the components of Charge 1 were combined and heated to a temperature of 60° C., then stirred for approximately 30 minutes until dissolved. The solution was cooled to room temperature and the charge 2 components were added and stirring was continued for 1 hour.

TABLE 3

| | Example 5 | CE 6 | Example 7 | CE 8 |
|---|---|---|---|---|
| Charge 1 | | | | |
| Photochromic dye blend 2[x] | 5.99 | 5.99 | 5.98 | 5.98 |
| TINUVIN ® 144 | 2.00 | 2.00 | 2.00 | 2.00 |
| IRGANOX ® 245 | 2.00 | 2.00 | 2.00 | 2.00 |
| (3-Glycidoxypropyl) trimethoxysilane | 4.50 | 4.50 | 4.47 | 4.47 |
| BYK ® 333 | 0.08 | 0.08 | 0.08 | 0.08 |
| N-methyl pyrrolidinone | 53.28 | 53.28 | 53.30 | 53.30 |
| Charge 2 | | | | |
| LUMIFLON ® LF910LM[xi] | 15.1 | — | 30.2 | — |
| TRIXENE ® BI-7960 | 82.8 | 82.8 | 68.6 | 68.6 |
| ETERNACOL PH-300D | 32 | 32 | 32 | 32 |
| Dibutyltin dilaurate | 0.36 | 0.36 | 0.35 | 0.35 |

[x]Blend of photochromic indenofused naphthopyran dyes formulated to give a grey color on activation

[xi]Fluoroethylene vinyl ether with a reported hydroxyl equivalent weight of 561 g/mole (on solids), and a number average molecular weight (Mn) of 15,000 g/mole as determined by GPC with polystyrene standard and tetrahydrofuran diluent, commercially available from AGC chemicals. Provided at 66% solids in xylene.

Part 2. Preparation of Photochromic Test Specimens

The compositions of each example and comparative example were applied to PDQ® coated Gentex® polycarbonate plano lenses, each having a diameter of 76 millimeters. Prior to coating, each lens was treated with corona using Tantec equipment with 70 KV and 1000 W settings. Each composition was spin-coated onto the substrate in amounts sufficient to yield a target dry thickness of 20 microns. The test specimens were prepared in duplicate, then subjected to 1 hour cure in a forced air oven at 125° C.

Part 3. Properties of Test Specimens

Part 3a. Micro Hardness Evaluation

One set of test specimens for each example and comparative example were subjected to an additional thermal cure for three hours at 105° C. and set aside for hardness measurements. These specimens were then subjected to micro-hardness testing using a Fischerscope HCV, Model H100SMC available from Fischer Technology, Inc. The hardness was measured at a penetration depth of 2 microns after a 100 mNewton load for 15 seconds. Each test specimen was measured at least twice and the resulting data was averaged.

Part 3b. Photochromic Performance

The second set of test specimens for each example and comparative example were further treated with corona as previously described and spin-coated with a protective coating according to the formulation reported in Table 1 of Example 1 in U.S. Pat. No. 7,410,691. The test specimens were cured in a UV oven equipped with D bulbs. Following this UV cure, each test specimen was thermally cured at 105° C. for three hours.

The photochromic performance of the test specimens was tested on the Bench for Measuring Photochromics ("BMP") made by Essilor, Ltd. France. The BMP was maintained at a constant temperature of 73.4° F. (23° C.) during testing.

Prior to testing, each of the coated test specimens was exposed to 365-nanometer ultraviolet light for about 10 minutes at a distance of about 14 centimeters to activate the photochromic materials. The UVA (315 to 380 nm) irradiance at the lens was measured with a LICOR® Model Li-1800 spectroradiometer and found to be 22.2 watts per square meter. Each test specimen was then placed under a 500 watt, high intensity halogen lamp for about 10 minutes at a distance of about 36 centimeters to bleach (inactivate) the photochromic materials. The illuminance at the specimen was measured with the LICOR® spectroradiometer and found to be 21.9 Klux. Each test specimen was then kept in a dark environment at room temperature (from 70 to 75° F., or 21 to 24° C.) for at least one hour prior to testing on the BMP. Prior to measurement, each lens was measured for ultraviolet absorbance at 390 nanometers (Abs 390 nm).

The BMP optical bench was fitted with two 150-watt Newport Model #6255 Xenon arc lamps set at right angles to each other. The light path from Lamp 1 was directed through a 3 mm SCHOTT® KG-2 band-pass filter and appropriate neutral density filters that contributed to the required UV and partial visible light irradiance level. The light path from Lamp 2 was directed through a 3 mm SCHOTT® KG-2 band-pass filter, a SCHOTT® short band 400 nm cutoff filter and appropriate neutral density filters in order to provide supplemental visible light illuminance. A 2 inch×2 inch (5.08 cm×5.08 cm) 50% polka dot beam splitter set at 45° to each lamp is used to mix the two beams. The combination of neutral density filters and voltage control of the Xenon arc lamp were used to adjust the intensity of the irradiance. Software i.e., BMPSoft version 2.1e was used on the BMP to control timing, irradiance, air cell and sample temperature, shuttering, filter selection, and response measurement. A ZEISS® spectrophotometer, Model MCS 601, with fiber optic cables for light delivery through the lens was used for response and color measurement. Photopic response measurements were collected on each lens.

The power output of the optical bench, i.e., the dosage of light that the lens was exposed to, was adjusted to 6.7 watts per square meter (W/m$^2$) UVA, integrated from 315-380 nm, and 50 Klux illuminance, integrated from 380-780 nm. Measurement of this power set point was made using an irradiance probe and the calibrated Zeiss spectrophotometer. The lens sample cell was fitted with a quartz window and self-centering sample holder. The temperature in the sample cell was controlled at 23° C. through the software with a modified Facis, Model FX-10 environment simulator. Measurement of the sample's dynamic photochromic response and color measurements were made using the same Zeiss spectrophotometer with fiber optic cables for light delivery from a tungsten halogen lamp through the sample. The collimated monitoring light beam from the fiber optic cable was maintained perpendicular to the test sample while passing through the sample and directed into a receiving fiber optic cable assembly attached to the spectrophotometer. The exact point of placement of the sample in the sample cell was where the activating xenon arc beam and the monitoring light beam intersected to form two concentric circles of light. The angle of incidence of the xenon arc beam at the sample placement point was ≈30° from perpendicular.

Response measurements, in terms of a change in optical density (AOD) from the unactivated or bleached state to the activated or colored state were determined by establishing the initial unactivated transmittance, opening the shutter from the Xenon lamp(s) and measuring the transmittance through activation at selected intervals of time. Change in optical density was determined according to the formula: $\Delta OD=\log 10(\% T_b/\% T_a)$, where $\% T_b$ is the percent transmittance in the bleached state and $\% T_a$ is the percent transmittance in the activated state. Optical density measurements were based on photopic optical density.

The results of the micro-hardness and photochromic performance for each of the examples and comparative examples are shown in Tables 4 to 6. The ΔOD at saturation was after 15 minutes of activation and the Fade Half Life ("T½") value is the time interval in seconds for the ΔOD of the activated form of the photochromic material in the coating to reach one half the saturated ΔOD at 73.4° F. (23° C.), after removal of the activating light source.

Test Results—Example 1 and Comparative Example 2

Test results comparing the photochromic composition of Example 1 versus the composition of Comparative Example 2 (CE 2) are presented in Table 4 below. The results in Table 4 illustrate the increase in hardness when a hydroxyl-functional fluorinated polymer is present at 2.9% on total solids in a coating composition comprising a polycarbonate diol and an acrylic polyol. The hardness is increased while the photochromic performance is not affected.

TABLE 4

| Example | Fischer micro-hardness (N/mm$^2$) | ΔOD | T1/2 @ Photopic (seconds) |
|---|---|---|---|
| Example 1 | 51 | 0.63 | 37 |
| CE 2 | 36 | 0.64 | 37 |

The photochromic composition of Example 1 with LF916F having 25 mole percent or 3.3 weight percent in the coating gave 42% improvement in coating hardness while maintaining fade T½ and all other properties as compared with the photochromic composition of Comparative Example 2.

Test Results—Example 3 and Comparative Example 4

Test results comparing the photochromic composition of Example 3 versus the composition of Comparative Example 4 (CE 4) are presented in Table 5 below. The results summarized in Table 5 demonstrate that the presence of a hydroxyl-functional fluorinated polymer at 3.8% on total solids increases hardness in a coating comprising a thermoplastic urethane diol, without affecting the photochromic performance.

TABLE 5

| Example | Fischer micro-hardness (N/mm$^2$) | ΔOD | T1/2 @ Photopic (seconds) |
|---|---|---|---|
| Example 3 | 25 | 0.63 | 33 |
| CE 4 | 12 | 0.63 | 33 |

Test Results—Examples 5 and 7 and Comparative Examples 6 and 8

Test results comparing the photochromic composition of Examples 5 and 7 versus the compositions of Comparative Examples 6 and 8 are presented in Table 6 below. The results in Table 6 demonstrate an increase in hardness when a hydroxyl-functional fluorinated polymer is present at 8.7% (Example 5) and 17.5% (Example 7) on total solids in a coating composition comprising a polycarbonate diol and no acrylic polyol. The hardness is increased while the photochromic performance is not affected.

TABLE 6

| Example | Fischer micro-hardness (N/mm$^2$) | ΔOD | T1/2 @ Photopic (seconds |
|---|---|---|---|
| Example 5 | 36 | 0.89 | 63 |
| CE 6 | 23 | 0.88 | 62 |
| Example 7 | 34 | 0.90 | 67 |
| CE 8 | 15 | 0.86 | 65 |

While specific embodiments of the present invention have been described in detail, it will be appreciated by those skilled in the art that various modifications and alternatives to those details could be developed in light of the overall teachings of the disclosure. Accordingly, the particular embodiments disclosed herein are intended to be illustrative only and not limiting as to the scope of the invention which is to be given the full breadth of the appended claims and any and all equivalents thereof.

The invention claimed is:

1. A curable photochromic composition comprising:
(a) at least one photochromic material;
(b) an active hydrogen group-containing component comprising:
(i) an active hydrogen group-containing fluorinated polymer having an active hydrogen group equivalent weight ranging from 200 to 5000 g/mole and a number average molecular weight ranging from 5,000 to 50,000 g/mole, and
(ii) a polymer having at least two active hydrogen groups per molecule, a number average molecular weight of at least 1000 g/mole, and an equivalent weight of at least 500 g/mole; and
(c) a curing agent comprising functional groups which are reactive with active hydrogen groups.

2. The curable photochromic composition of claim 1, wherein the active hydrogen group-containing component (b) further comprises:
(iii) a compound having at least 3 active hydrogen groups per molecule and an equivalent weight of less than or equal to 480 g/mole.

3. The curable photochromic composition of claim 1, wherein the active hydrogen group-containing fluorinated polymer (i) comprises a fluoroethylene vinyl ether copolymer.

4. The curable photochromic composition of claim 1, wherein each active hydrogen group of the active hydrogen group-containing component (b) is independently selected from the group consisting of hydroxyl groups, thiol groups, primary amino groups, and secondary amino groups.

5. The curable photochromic composition of claim 1, wherein each active hydrogen group of the active hydrogen group-containing resinous component (b) is a hydroxyl group.

6. The curable photochromic composition of claim 1, wherein the active hydrogen group-containing polymer (ii) is selected from the group consisting of polycarbonate polyols, polyester polyols, polyether polyols, polyurethane polyols, co-polymers thereof, and mixtures thereof.

7. The curable photochromic composition of claim 1, wherein the curing agent (c) is selected from the group consisting of polyisocyanates, polyepoxides, alkoxysilanes, poly(anhydride), polyisothiocyanates, and aminoplasts.

8. The curable photochromic composition of claim 1, wherein the curing agent (c) comprises polyisocyanate.

9. The curable photochromic composition of claim 1, wherein the active hydrogen group-containing fluorinated polymer (i) is present in an amount of 0.1 to 30% by weight based on total weight of solids of the curable photochromic composition.

10. The curable photochromic composition of claim 1, wherein the photochromic material (a) comprises a compound selected from the group consisting of naphthopyrans, benzopyrans, phenanthropyrans, indenonaphthopyrans, spiro(indoline)naphthoxazines, spiro(indoline)pyridobenzoxazines, spiro(benzindoline)pyridobenzoxazines, spiro(benzindoline)naphthoxazines, spiro(indoline)-benzoxazines, fulgides, fulgimides, and mixtures thereof.

11. The curable photochromic composition of claim 1, further comprising an additive selected from the group consisting of photoinitiators, thermal initiators, polymerization inhibitors, solvents, ultraviolet light absorbers, hindered amine light stabilizers, antioxidants, heat stabilizers, mold release agents, rheology control agents, leveling agents, free radical scavengers, adhesion promoters, plasticizers, and mixtures thereof.

12. A polymeric photochromic film formed from the curable photochromic composition of claim 1.

13. An article comprising:
(A) a substrate; and
(B) a photochromic layer over at least a portion of the substrate, wherein the photochromic layer is formed from a curable photochromic composition comprising:
(a) at least one photochromic material;
(b) an active hydrogen group-containing component comprising:
(i) an active hydrogen group-containing fluorinated polymer having an active hydrogen group equivalent weight ranging from 200 to 5000 g/mole and a number average molecular weight ranging from 5,000 to 50,000 g/mole, and
(ii) a polymer having at least two active hydrogen groups per molecule, a number average molecular weight of at least 1000 g/mole, and an equivalent weight of at least 500 g/mole; and
(c) a curing agent comprising functional groups which are reactive with active hydrogen groups.

14. The article of claim 13, wherein the substrate (A) comprises a polymeric material selected from the group consisting of polycarbonate, polycyclic alkene, polyurethane, poly(urea) urethane, polythiourethane, polythio(urea) urethane, polyurea, poly(allyl carbonate) polymers, cellulose acetate, cellulose diacetate, cellulose triacetate, cellulose acetate propionate, cellulose acetate poly(vinylidene chloride), poly(ethylene terephthalate), polyester, polysulfone, polyolefin, copolymers thereof, and mixtures thereof.

15. The article of claim 13,
wherein the article is selected from the group consisting of ophthalmic articles, display articles, windows, mirrors, active liquid crystal cell articles, and passive liquid crystal cell articles; or
wherein the article is an ophthalmic article, and the ophthalmic article is selected from the group consisting of corrective lenses, non-corrective lenses, contact lenses, intra-ocular lenses, magnifying lenses, protective lenses, and visors; or wherein the article is a display article, and the display article is selected from the group consisting of screens, monitors, and security elements.

* * * * *